United States Patent [19]

Velius

[11] Patent Number: 5,594,784
[45] Date of Patent: Jan. 14, 1997

[54] APPARATUS AND METHOD FOR TRANSPARENT TELEPHONY UTILIZING SPEECH-BASED SIGNALING FOR INITIATING AND HANDLING CALLS

[75] Inventor: George A. Velius, Glencoe, Mo.

[73] Assignee: Southwestern Bell Technology Resources, Inc., St. Louis, Mo.

[21] Appl. No.: 52,607

[22] Filed: Apr. 27, 1993

[51] Int. Cl.$^6$ ................................................ H04M 1/64
[52] U.S. Cl. .............................. 379/88; 379/159; 379/216; 379/217; 379/355
[58] Field of Search ........................... 379/67, 88, 89, 379/201, 216, 245, 249, 355, 207, 52, 57, 159, 217, 157, 374; 381/42, 43; 370/110.1, 62, 60, 61

[56] References Cited

U.S. PATENT DOCUMENTS

| | | |
|---|---|---|
| Re. 32,012 | 10/1885 | Pirz et al. . |
| 3,321,580 | 5/1967 | Horne et al. . |
| 3,725,585 | 4/1973 | Moniak et al. . |
| 3,725,602 | 4/1973 | Hoffman . |
| 3,743,791 | 7/1973 | Duff et al. . |
| 4,101,735 | 7/1978 | Bridenbaugh . |
| 4,495,383 | 1/1985 | Lubin et al. . |
| 4,551,581 | 11/1985 | Doughty ............................ 379/372 |
| 4,644,107 | 2/1987 | Clowes et al. . |
| 4,720,848 | 1/1988 | Akiyama ........................... 379/88 |
| 4,731,811 | 3/1988 | Dubus . |
| 4,827,518 | 5/1989 | Feustel et al. . |
| 4,837,808 | 6/1989 | Immendorfer et al. . |
| 4,870,686 | 9/1989 | Gerson et al. ................... 379/355 |
| 4,945,570 | 7/1990 | Gerson et al. ................... 379/88 |
| 4,961,212 | 10/1990 | Marui et al. . |
| 5,007,081 | 4/1991 | Schmuckal et al. ............. 379/354 |
| 5,014,303 | 5/1991 | Velius . |
| 5,054,053 | 10/1991 | Sakanishi et al. . |
| 5,131,029 | 7/1992 | Kunstadt . |
| 5,202,917 | 4/1993 | Wakai ............................... 379/159 |

FOREIGN PATENT DOCUMENTS

| | | |
|---|---|---|
| 0105441 | 4/1984 | European Pat. Off. . |
| 56-20367 | 2/1981 | Japan . |
| 58-207756 | 12/1983 | Japan . |
| 2229607 | 9/1990 | United Kingdom . |
| 2240693 | 8/1991 | United Kingdom . |

OTHER PUBLICATIONS

Telos ASK 101 Access Systems Kit Applications Interface User's Guide, Document No. 600.0024.00.002, Telcos Communications, Inc., Eatontown, New Jersey, Apr. 1991.
Japanese Patent Abstract of vol. 26, No.59, (E–232) of Mar. 17, 1984.
Japanese Patent Abstract of vol. 5, No. 70 (E–56) May 12, 1981.

(List continued on next page.)

Primary Examiner—Krista M. Zele
Assistant Examiner—Fan Tsang
Attorney, Agent, or Firm—Greenblum & Bernstein, P.L.C.

[57] ABSTRACT

A transparent telephony system is disclosed for providing hands-free communication. The transparent telephony system includes a device for initiating a call between a caller's location and a call destination based on a voice utterance (e.g., the call recipient's name) made by the caller, a device for reproducing the voice utterance made by the caller at the call destination so that the call recipient may identify the caller, and a device for handling the call attempt in accordance with a voice utterance made by the call recipient. The call handling device enables the call recipient to optionally accept the initiated call and establish two-way voice communication with the caller by uttering an appropriate voice command (e.g., "go-ahead" or "yes"). Further, the system provides telecommunications between parties that seems "transparent" with respect to the actual communication network involved, partly since the caller's voice command initiating the call and the call recipient's acceptance utterance are forwarded and heard by the respective parties as if they are initiating a normal conversation with one another in the same room or location.

39 Claims, 7 Drawing Sheets

OTHER PUBLICATIONS

D. Zeheb, "Secretarial Branch Exchange," IBM Technical Disclosure Bulletin, vol. 26, No. 5, pp. 2645–2647 (Oct. 1983).

International Search Report and Annex.

Lamel, L. F., et al., "An Improved End Point Detector for Isolated Word Recognition," IEEE Transactions, vol. ASSP-29, pp. 777–785, Aug. 1981.

Picone, J., Johnson, M. A., Hartwell, W. T., "Enhancing the Performance of Speech Recognition with Echo Cancellation," International Conference on Acoustic, Speech, and Signal Processing (ICASSP), vol. 1, pp. 529–532, Apr. 1988.

Sakoe, H., and Chiba, C., "Dynamic Programming Algorithm Optimization for Spoken Word Recognition," IEEE Transactions, vol. ASSP-26, No. 1, pp. 43–49, Feb. 1978.

Velius, G., "Variants of Cepstrum Based Speaker Identity Verification," International Conference on Acoustic, Speech, and Signal Processing (ICASSP), vol. 1, pp. 583–586, Apr. 1988.

Welbon, Y., "Digital Voice Caller," Telocator, p. 20, Nov., 1991.

"Voice Processing Industry Notes", Voicenews, p. 12, Stoneridge Technical Services, 1992.

Japanese Publication (source unknown), "Cordless Phone", published prior to Nov. 10, 1992.

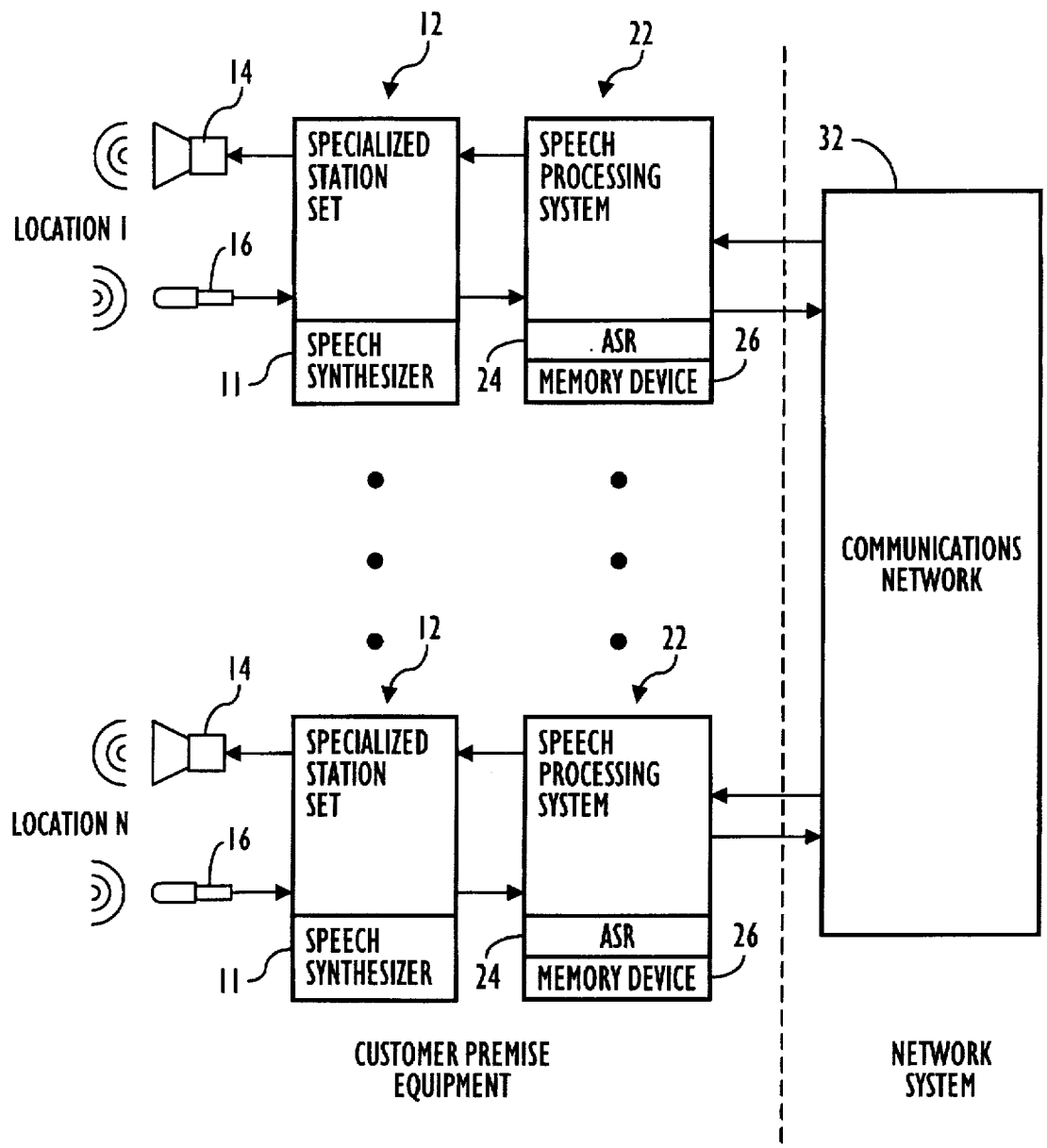

APPARATUS AND METHOD FOR TRANSPARENT TELEPHONY UTILIZING SPEECH-BASED SIGNALING FOR INITIATING AND HANDLING CALLS

BACKGROUND OF THE INVENTION

1. Field of the Invention

The present invention is related to an apparatus and method for hands-free telephony. More particularly, the present invention relates to an apparatus and method for transparent telephony that utilizes, amongst other things, speech-based signaling for initiating and handling calls.

2. Background Information

In conventional telephone communication systems, a protocol consisting of a series of known tasks or operations must be followed by users in order to initiate and establish two-way voice communication. This protocol has traditionally imposed a burden on users of telephony, and especially on those placing or originating an outgoing call.

Typically, when a caller desires to place a telephone call, the caller first must activate the system by lifting a handset at his or her location. After determining the system status by detecting a dial tone, the caller then inputs an arbitrary code (e.g., an individual's telephone number) to specify the desired call recipient. Thereafter, the system status is again monitored by the caller by listening for any one of a number of predetermined tone signals indicating, e.g., ringing, line busy, system busy, or network intercept. Upon receipt and acceptance of the call by the call recipient, the caller then normally introduces him or herself.

Traditional telephony protocol has also imposed significant burdens on the call recipient, albeit to a lesser extent. After a call has been initiated by the caller, the call recipient at the other end hears an anonymous ringing signal. If the call recipient is present and decides to accept the initiated telephone call, the call recipient may establish two-way voice communication over the system by lifting a handset at his or her location and acknowledging receipt by saying something like "hello". Normally, once the calling party has identified him or herself, the call recipient may identify the caller and determine how to further process the call (e.g., converse, take message, terminate call, etc.).

Recently, there have been attempts to simplify the process for initiating and processing telephone calls and, hence, lessen the burdens of traditional telephony protocol. For example, in order to minimize the burden of memorizing and time for inputting a code for specifying a particular call destination, telephone sets have been designed with one-button dialing wherein stored telephone code sequences are recalled and automatically dialed. Further, some telephone companies have begun to offer speed calling services, wherein a call can be initiated by dialing a "shortened" code sequence (comprising, for example, two or three digits) that represents a longer code sequence (comprising, for example, seven to twelve digits) defined by the customer. Still, others have attempted to simplify various tasks of telephony protocol by designing telephone equipment that utilizes speech recognition to interpret voice commands. For example, U.S. Pat. No. 4,870,686 to GERSON et al. and U.S. Pat. No. 4,731,811 to DUBUS disclose voice dialing systems for mobile radio telephones in vehicles, and U.S. Pat. No. 4,945,570 to GERSON et al. discloses a method for terminating a telephone call by voice command.

In addition, answering machines have been introduced for automatically answering call attempts and taking messages when the intended call recipient is unavailable. Further, caller identification services and equipment are available for displaying the caller's telephone number at the call recipient's location, so that the caller may be identified prior to acceptance of the call.

However, despite these advances, telephony users are for the most part still burdened by the existing constraints of telephony protocol. Telephony users, in making or receiving a call, still must not only tactilely interact with the telephone system, but also must spend time to interface with the system. Recent and past attempts to address these problems still fail to provide totally hands-free communication wherein users can converse with one another as if they were in the same room, by the use of simple verbal exchanges rather than conventional push-buttons, numbers, beeps, tones and/or rings. Such features would be highly desirable, for example, in an office environment or situations where frequent communications are required.

SUMMARY OF THE INVENTION

In view of the foregoing, the present invention, through one or more of its various aspects, embodiments and/or specific features or subcomponents thereof, is thus intended to bring about one or more of the objects and advantages as specifically noted below.

A general object of the present invention is to provide an apparatus and method for transparent telephony that overcomes the traditional burdens of telephony protocol (e.g., lifting a handset, detecting a dial tone, inputting an arbitrary code, etc.).

More particularly, an object of the present invention is to provide an apparatus and method for transparent telephony that utilizes speech based signaling for initiating and processing calls, and that provides totally hands-free communication for both the caller and the call recipient.

Another object of the present invention is to provide a transparent telephony system in which a caller's voice is used to initiate a call, and the caller's utterance is forwarded and reproduced at the call recipient's location in order to serve as a form of caller identification to the call recipient.

Still another object of the present invention is to provide a transparent telephony system that creates the perception for users that communication is being carried out as if they are closely situated with respect to one another, e.g., as if they were in the same room or location, and that provides a "transparent" quality to the communications network of the system.

Yet another object of the present invention is to provide a transparent telephony system that eliminates the use of dial tones and ringing, and that indicates the presence of an incoming call to a call recipient by reproducing an audible likeness of the caller's voice at the call recipient's location. Further, an object of the present invention is to enable the call recipient to identify the caller and to optionally accept or refuse the incoming call by voice command, subsequent to the caller's voice being reproduced at the call recipient's location, and before the caller knows whether the call recipient is present.

Another object of the present invention is to provide a transparent telephony system that automatically detects and recognizes voice utterances, and that enables a call to be initiated and/or processed (e.g., accepted or refused) by voice command, including identifying the destination of the call in response to the caller's voice utterance.

According to one embodiment of the present invention, a transparent telephony system is provided for establishing voice communication over a communication network between a caller and a call recipient. The transparent telephony system comprises means for initiating a call from a caller's location to a call destination based on the voice utterance made by the caller, and means for reproducing an audible likeness of the voice utterance made by the caller at the call destination subsequent to the call being initiated by the initiating means, so that the call recipient may identify the caller on the basis of the caller's voice characteristics.

The initiating means may include an automatic speech recognition system for detecting and recognizing spoken voice utterances made by the caller. Further the initiating means may include means for determining the call destination based on the detection and recognition of the caller's voice utterance by the automatic speech recognition system.

In addition, the determining means may include a dialing list stored in a memory device for determining the call destination based on the voice utterance detected and recognized by the automatic speech recognition system.

Further, in accordance with an aspect of the present invention, the call destination may be the call recipient's network address or location.

According to another embodiment of the present invention, a transparent telephony system is provided for establishing voice communications over a communications network between a caller and a call recipient. The transparent telephony system includes means for initiating a call from a caller's location to a call destination, means for reproducing a voice utterance made by the caller at the call destination subsequent to the call being initiated by the initiating means, so that the call recipient may identify the caller, and means for processing the initiated call based upon the voice utterance made by the call recipient. The processing means enables the call recipient to optionally accept the call and establish two-way voice communication.

The processing means may include means for converting the voice utterance made by the caller in an acoustic form into an electrical form and means for forwarding the voice utterance in the electrical form to the call destination. The reproducing means may further include means for converting the voice utterance forwarded by the forwarding means in the electrical form into an acoustic form.

In addition, the processing means may include an automatic speech recognition system for detecting and recognizing spoken voice utterances made by the call recipient. The processing means may further include means for enabling the call recipient to optionally select among a plurality of call processing operations, each of the call processing operations being initiated based on a predetermined voice command made by the call recipient, and detected and recognized by the automatic speech recognition system.

In accordance with another aspect of the present invention, the transparent telephony system may further include means for screening the initiated call, wherein the screening means includes a speaker identity recognition system for determining the identity of the caller by detecting and recognizing the voice utterance made by the caller, and screening the call based on the determined identity of the caller.

Further, the transparent telephony system may be provided with means for disconnecting the call based upon a voice utterance made by the caller or the call recipient, whereby the caller or the call recipient may disconnect the call after the call has been accepted by the call recipient.

In addition, in accordance with an aspect of the present invention, the call destination may be the call recipient's network address or location.

According to still another aspect of the present invention, a method of transparent telephony is provided. A call is initiated from a caller's location to a call destination based on the voice utterance made by a caller. The voice utterance made by the caller is reproduced at the call destination after the call has been initiated, and thereafter the call is processed in response to detection of a voice utterance made by a call recipient so that the call recipient may optionally accept the call and establish two-way voice communication with the caller.

In accordance with yet another aspect of the present invention, a transparent telephony system is provided for establishing two-way voice communication over a communication network between a caller and call recipient. The transparent telephony system includes means for initiating a call from a caller's location to a call destination in accordance with a voice utterance made by the caller, and means for processing the initiated call in response to detection of a voice utterance made by the call recipient. The processing means enables the call recipient to optionally accept the call and establish two-way voice communication with the caller.

The initiating means may include an automatic speech recognition system for detecting and recognizing spoken voice utterances, and means for determining the call destination based on a detection and recognition of the caller's voice utterance by the automatic speech recognition system. The initiating means may further include connection means for establishing a one-way voice communication between the caller and the call recipient based upon the determination of the call destination by the determining means.

In addition, the transparent telephony system may include means for recording the caller's voice utterance and means for reproducing the voice utterance recorded by the recording means at the call destination subsequent to the determination of the call destination by the determining means.

Further, the transparent telephony system may include means for reproducing a synthesized voice message or a recorded audio message at the call destination subsequent to the call being initiated by said initiating means.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIGS. 1A and 1B illustrate a transparent telephony system in accordance with one embodiment of the present invention with network-based and customer premise equipment (CPE)-based speech processing, respectively;

DETAILED DESCRIPTION OF THE PREFERRED EMBODIMENTS

Figure 1A:
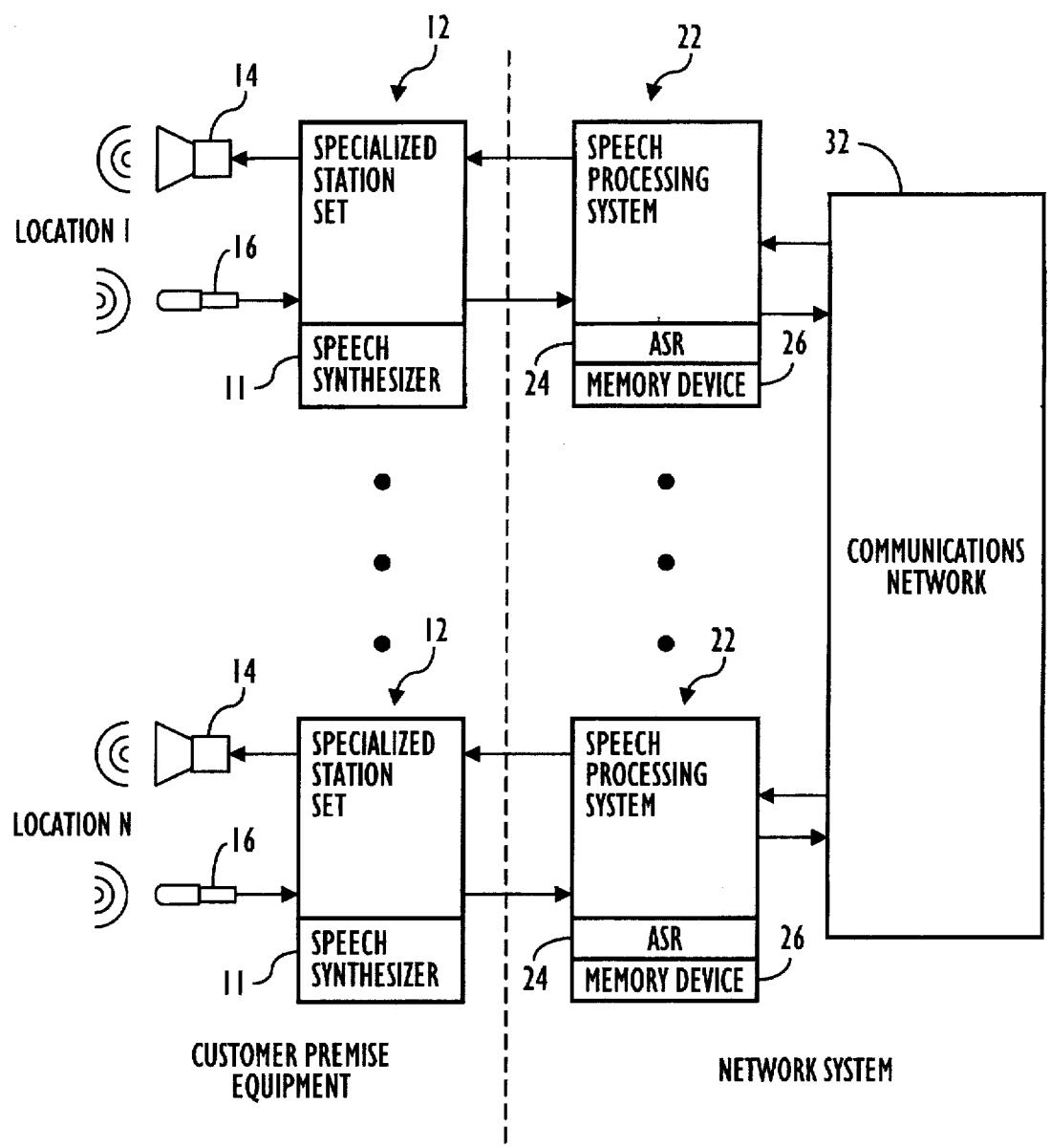

Referring now to the accompanying drawings, FIGS. 1A and 1B illustrate a general block diagram of the transparent telephone system in accordance with a first embodiment of the present invention.

A communications network 32 is provided for interconnecting and communicating voice signals between a plurality of customers at N locations (where N is an integer greater than 1). At each of the customer locations, a specialized station set 12 is provided for inputting and outputting audio signals, including voice commands and utterances. Each station set 12 is coupled to communications network 32 through a speech processing system 22. As indicated in FIGS. 1A and 1B, respectively, speech processing system 22 of the present invention may either be network-based or customer premise equipment (CPE)-based, or a hybrid combination of the same, e.g., depending on where the speech processing system is located. However, it should be noted that where the complete transparent telephony system is implemented within a local environment, e.g., within an office building, the CPE/network distinction may become less significant in terms of implementation.

Figure 2:
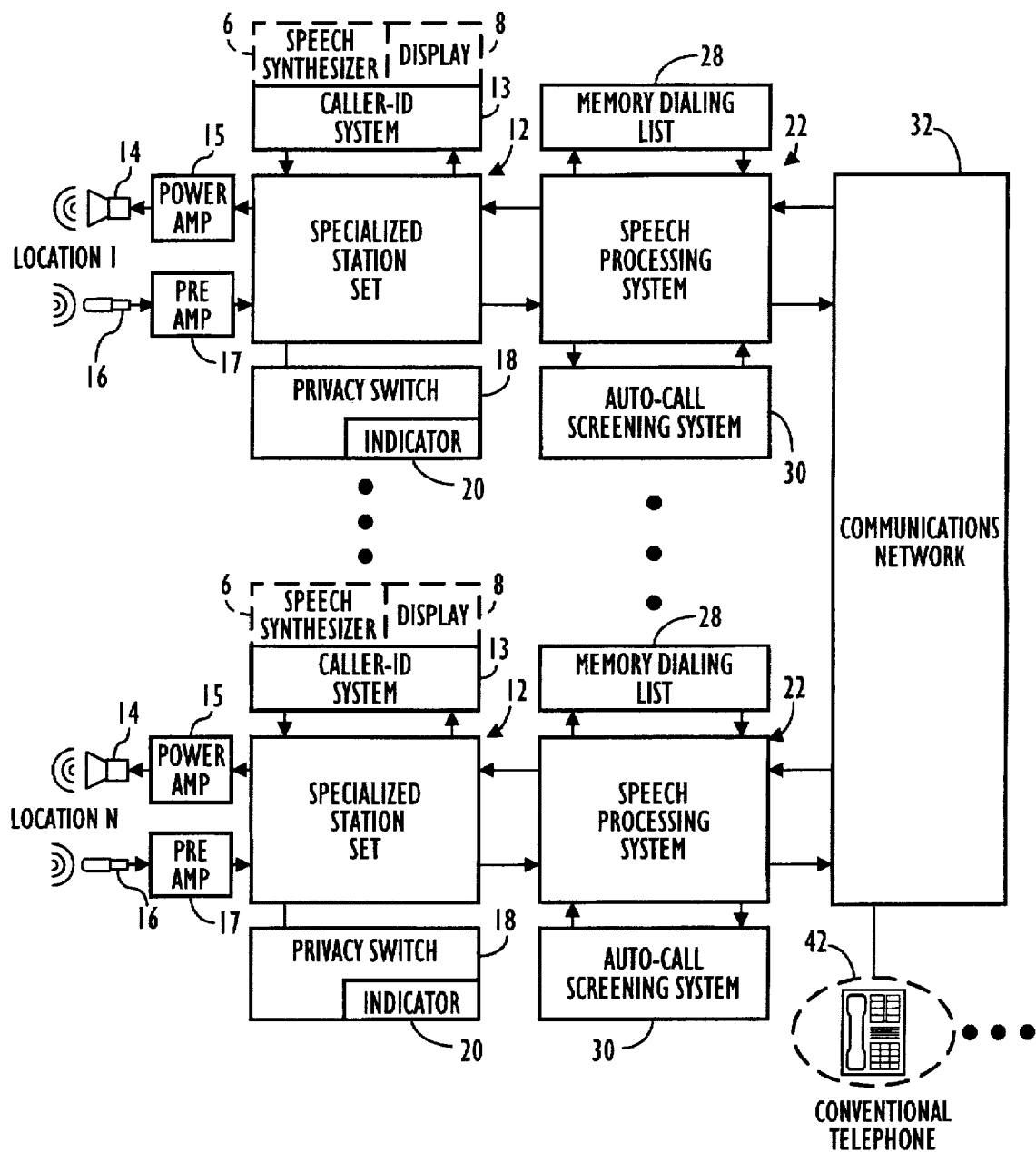
FIG. 2 illustrates a second embodiment of a transparent telephony system according to the present invention.

Station set 12 includes, at each location, a microphone 16 for converting voice utterances made by a caller or a call recipient from acoustic audio signals into electrical audio signals. Microphone 16 is not limited to a single microphone. For example, microphone 16 may comprise an array of microphones, smaller than that used in tele-conferencing, having sufficient sensitivity and directional characteristics. Further, as shown in FIG. 2, a pre-amplifier 17 may be used with microphone 16.

Station set 12 also includes a speaker 14 for converting electrical audio signals, which are provided as input from speech processing system 22, into acoustic audio signals. As shown in FIG. 2, speaker 14 may be provided with a power amplifier 15. In order to provide privacy, an optional handset or earpiece may be provided in place of speaker 14.

In order to prevent acoustic feedback that may occur from speaker 14 to microphone 16 during full-duplex communication, station set 12 may also include a conventional method for cancelling feedback. For example, for a discussion of echo-cancellation techniques, see Picone, J., Johnson, "Enhancing the Performance of Speech Recognition with Echo Cancellation," *International Conference on Acoustics, Speech, and Signal Processing*, (ICASSP), Vol. 1, pages 529–532, April 1988, and U.S. Pat. No. 3,725,585 to MONIAK, which discloses a device for acoustically decoupling a speaker and a microphone by comparing the voice signals from each direction and amplifying the stronger signal while attenuating the weaker signal, each of which is expressly incorporated herein by reference in its entirety.

At each station set 12, voice utterances that are collected and converted into electrical audio signals by microphone 16, are input to speech processing system 22. Speech processing system 22 detects and recognizes spoken voice utterances so that the user may initiate and/or handle calls by uttering predetermined voice commands. For this purpose, speech processing system 22 includes an automatic speech recognition (ASR) system 24, which may be implemented with a speech recognition system known in the art. For examples of speech recognition systems which can be used, see U.S. Pat. Nos. 4,961,212 to MARUI et al., 4,945,570 to GERSON et al., 4,870,686 to GERSON et al., 4,731,811 to DUBUS and Reissue U.S. Pat. No. 32,012 to PIRZ et al., each of which is expressly incorporated herein by reference in its entirety.

The present invention, however, is not limited to any specific hardware or type of speech recognition system, and may use speaker-dependent or speaker-independent voice recognition, as well as isolated or continuous word recognition. ASR system 24 may also include word-spotting and background noise estimation capabilities to distinguish voice commands from normal room conversation. Further, the ASR system 24 that is provided in speech processing system 22 may be software-based, hardware-based, or implemented by a combination of software and hardware.

Speech processing system 22 may also include a memory device 26 for storing relevant speech patterns as "templates". The "templates" can then later be retrieved and compared with speech input by ASR system 24 in order to detect and recognize particular voice utterances. Memory device 26 also stores relevant telephone network and user specific information and/or messages. The present invention contemplates that memory device 26 may be implemented by computer storage disks, random access memory (RAM) modules, or any functionally equivalent storage device or combination of devices with sufficient memory capacity and accessing facilities.

Communications network 32 is capable of interconnecting any two transparent telephony locations and carrying voice signals in a full-duplex fashion. Network 32 may be implemented by Integrated Services Digital Network (ISDN), Public Branch Exchange (PBX), Ethernet, or an equivalent communication structure that is capable of providing the above-noted functions and that can be configured to forego or "hide" the traditional requirements of telephony protocol.

The necessary network requirements and interactions for the present invention may be met, for example, by ISDN and Ethernet applications, since both allow software customization of call setup and termination routines. In order to forego or hide the traditional requirements of telephony protocol, communications network 32 may be configured to detect an incoming call and process information about the call (e.g., call type or call origination), before initiating an optional audible ringing signal to the call destination. Further, network 32 may be setup to transfer a voice signal in some form (e.g., digital form) from the originating station to the destination in half-duplex fashion, without allowing full duplex audio until the call attempt is accepted by the call recipient by an appropriate voice command.

In order to provide a "transparent" quality and perception to users that communication is being carried out as if they are closely situated with respect to one another, network 32 may be provided with fast switching and signaling capabilities, so as to minimize the delays between initialization and acceptance of the call. In this regard, a delay of no more than about four seconds, between the time the call is initiated by the caller to the time at which the caller's voice utterance is reproduced at the destination, is desirable.

As noted above, specialized station set 12, speech processing system 22, and communication network 32 can each be implemented in accordance with conventional technology in any of the embodiments of the present invention. In fact, a more specific implementation of these devices is described below with respect to a third embodiment of the present invention shown in FIG. 3. These more specific implementations represent exemplary implementations of these devices in the first and second embodiments.

When a caller at one location desires to place a call to a call recipient at another location, if the caller is within the acoustic wave receive pattern of microphone 16, the caller need only utter the call recipient's name; alternatively, or in addition, the system may be configured so that a call may be initiated by the caller by uttering a series of digits, such as the telephone number of the call recipient. This voice utterance is then converted by microphone 16 into an electric audio signal that is provided as input to speech processing system 22. ASR system 24 of speech processing system 22 then determines the call destination based on the detection and recognition of the caller's voice utterance. For this purpose, e.g., a memory dialing list 28 may be provided, as shown in FIG. 2, for storing a user-defined list of call recipient names and their corresponding location telephone number and/or network address.

In order to convey that a communication attempt has been made, the caller's voice utterance is then forwarded, in half-duplex fashion, over communications network 32 to the call recipient's location where it is reproduced by speaker 14. The reproduction of the caller's voice utterance at the call recipient's location also serves as a form of caller identification to the call recipient, so that the caller may be identified based on his or her unique voice characteristics. After the caller's voice utterance is reproduced, the call recipient may then accept the call and establish full-duplex communication by uttering a voice command (e.g., "go-ahead"), or otherwise process the call by uttering other user-defined voice commands (e.g., "refuse call", "delay call" or "leave message") If the call is accepted, the call recipient's affirmative response is forwarded to the caller and full-duplex communication is established between both parties. After the call has been accepted, either party may disconnect the call by uttering an appropriate voice command (e.g., "disconnect") toward microphone 16 at his or her location.

Instead of the caller's voice utterance being reproduced after a call has been initiated, a synthesized voice message generated, e.g., by a conventional speech synthesizer 11, or a pre-recorded message or signal stored, e.g., in memory device 26, may be played back to the call recipient to indicate that a communication attempt has been made, and/or to indicate the identity of the caller to the recipient. For examples of conventional speech synthesizers that may be used, see U.S. Pat. Nos. 4,870,686 (Gerson et al.) and 4,731,811 (Dubus).

The transparent telephony system of the present invention may also include transparent telephony locations that are used or frequented by many users and incorporate speaker-independent ASR systems and speaker identity recognition (SIR) technology. At such locations, users may identify themselves to the network in order to place or receive calls from that location. When a call is initiated by voice command, the speaker-independent ASR system determines the call recipient's location based on the caller's voice command. A network-based memory dialing list may be utilized to keep track of the location of transparent telephony users at all times, wherein each of the users is associated with either a primary/default location or a temporary location. In order to automatically "screen" callers who are at a location with speaker-independent control, speech processing system 22 may be implemented with a "voice-print" matching system. Callers may then be granted or denied access to the system depending on the particular implementation of the matching system and settings thereof; e.g., the matching system may be configured by a user so that only a particular group of callers are granted or denied access.

As shown in FIG. 2, the transparent telephony system may include additional features as required by a user. It is noted that the embodiment depicted in FIG. 2 may be applied to a transparent telephony system, according to the present invention, with either a network-based system, a CPE-based speech processing system, or a hybrid combination of the same. Further, the additional features illustrated in FIG. 2 may be implemented in whole or in part with the other embodiments of the present invention, depicted in FIGS. 1A, 1B and 3, just as many of the features shown in each of the embodiments in FIGS. 1A, 1B, 2 and 3 can be employed in the other disclosed embodiments if desired.

Although the transparent telephony system of the present invention does not compromise privacy, since a caller cannot hear voice utterances made by a call recipient until the initiated call attempt is accepted and full-duplex communication is established, a supplemental privacy switch and indicator may be provided with station set 12 in order to overcome any perception that the user's privacy is being compromised. As illustrated in FIG. 2, a privacy switch 18 and an indicator 20 may be provided with station set 12. Switch 18 may be used by the user in order to turn the power from a voltage source (not shown) to station set 12 ON and OFF. Indicator 20 may include a light emitting diode (LED) that is connected to the voltage source via switch 18, and that is illuminated to indicate a "power-on" condition. Other functionally equivalent devices may be provided for indicating the status of station set 12, and assuring privacy to the user.

In addition, speech processing system 22 may be provided with an auto-call screening system 30 in order to automatically screen out unwanted callers and provide further privacy. Auto-call screening system 30 may utilize speaker identity recognition (SIR) technology in order to block or only allow attempted calls on the basis of the caller's identity. For examples of SIR technology, see Velius, G., "Variants of Cepstrum Based Speaker Identity Verification," *International Conference on Acoustics, Speech, and Signal Processing*, (ICASSP), Vol. 1, pages 583–586, April 1988 and U.S. Pat. No. 4,827,518 to FEUSTEL et al., each of which is expressly incorporated herein by reference in its entirety.

As further shown in FIG. 2, communications network 32 of the transparent telephony system may be adapted to allow users with transparent telephony equipment to place calls to locations with conventional telephones 42. This modification would enable transparent telephony users to communicate with one another and with individuals having only conventional telephone equipment. For calls placed to conventional telephones 42, it is noted that users at transparent telephony locations would be incumbered with some of the traditional telephony protocol requirements (e.g., listening for a ringing or busy tone, etc.). However, the transparent telephony user would still be able to utilize voice-based signaling for initiating and handling calls.

Further, any one of the transparent telephony systems of the present invention may be implemented with a caller-ID system 13 at each location for audibly and/or visually indicating the identity of the caller, as shown in FIG. 2. Caller-ID system 13 may include a memory device (not shown), for storing a user-defined list of names and their corresponding telephone numbers, and a conventional microprocessor (not shown) for controlling the operation of the system. When a call is initiated, caller-ID information and an incoming call indication signal are forwarded to the call recipient's location. Upon detection of the incoming call indication signal, the caller-ID-information is compared with the stored list by caller-ID system 13 in order to determine the caller's identity. The caller's name or telephone number, and/or other information (e.g., "long distance call") may then be audibly produced via a conventional speech synthesizer 6 and speaker 14 and/or visually indicated by a display device 8 (e.g., LED, LCD, CRT, etc.) at the call recipient's location. Thereafter, the call recipient may accept, refuse, or process the call in another manner by voice command, as discussed above.

Figure 3:
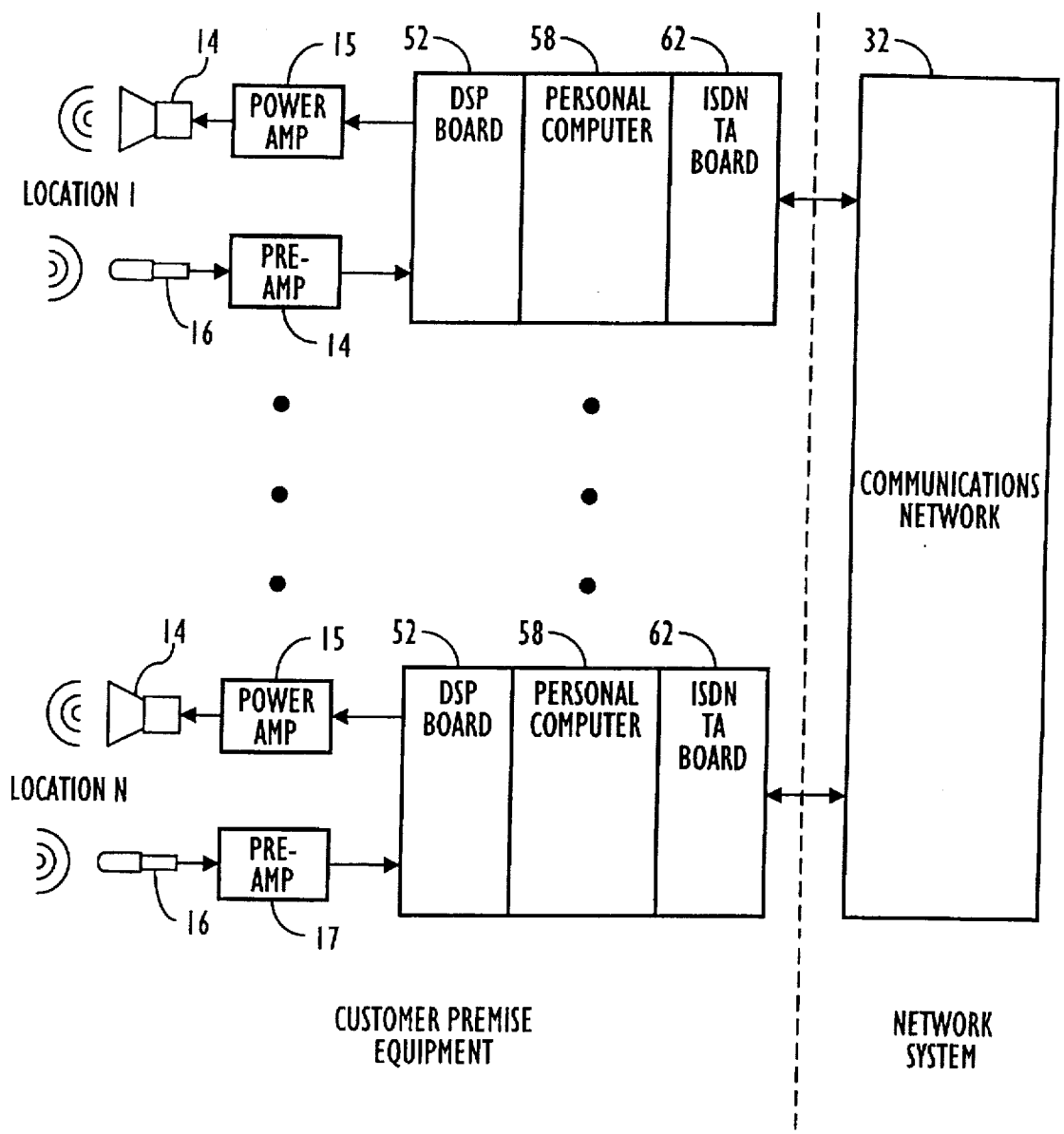
FIG. 3 illustrates a third embodiment of a transparent telephony system in accordance with the present invention, utilizing CPE-based speech processing.

Referring now to FIG. 3, a third embodiment of a transparent telephony system in accordance with the present invention will be described.

In the illustrated embodiment, communications network 32 is provided for interconnecting a plurality of transparent telephony locations. The customer premise equipment at each transparent telephony location includes a microphone 16 with a pre-amplifier 17 and a speaker 14 with a power amplifier 15 for inputting and outputting audio signals, respectively. Also provided at each location is a digital signal processor (DSP) board 52, a personal computer (PC) 58, and an ISDN terminal adapter (TA) board 62.

As an illustrative, non-limiting example, a Spectrum DSP32C System Board, available from Spectrum Signal Processing, Inc., Westborough, Mass., may be used for DSP board 52, and a 386-microprocessor class, or other processor type, personal computer available in the market may be used for PC 58. Rather than providing a general purpose PC, a dedicated and custom-configured microprocessor, multiprocessor or other appropriate computing device may be provided in place of PC 358. Further, a Teleos B101PC ISDN Terminal Adapter, available from Teleos Communications, Inc., Eatontown, N.J., may be used for TA board 62. In addition, depending on the number of locations, a telephone company central office switch, such as an AT&T No. 5 ESS, may be used for communications network 32, or the network may be implemented by ISDN, PBX or Ethernet, as noted above. These noted example implementations are merely illustrative and should not preclude the use of any alternative, functionally equivalent and/or compatible implementation.

As shown in FIG. 3, audio signals from pre-amplifier 17 of microphone 16 are connected directly to DSP board 52, and electronic audio signals from the output of DSP board 52 are connected to power amplifier 15 of speaker 14. Signal processing of these signals is performed by DSP board 52. This includes, e.g., converting signals in analog form into digital form, digital signal encoding and decoding, and several aspects of ASR.

TA board 62 at each location is connected to communications network 32, and performs the necessary network interaction for establishing communication over the network. This includes, e.g., signaling for indicating a communication attempt or termination, network status determination and data transport.

DSP board 52 and TA board 62 are compatible with PC 58, and, as illustrated in the present exemplary embodiment, are directly connected to the PC. PC 58 performs general administration computing for the managing of user specific data, maintenance and test capabilities, and general computing overhead for data storage. PC 58 also manages the control of specific components and the initialization and downloading process for DSP board 52 and TA board 62, as further discussed below.

Figure 4:
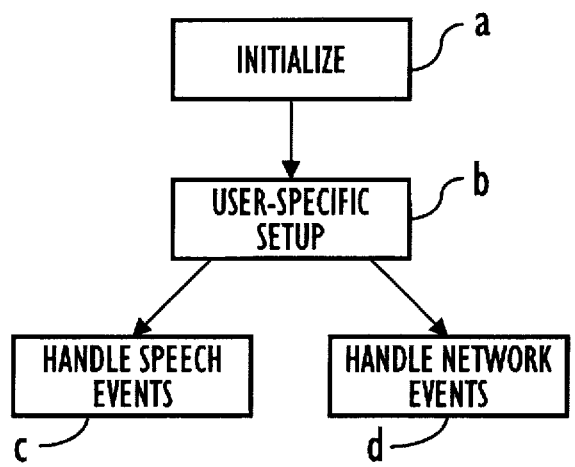
FIG. 4 illustrates the high-level software architecture of an implementation of the transparent telephony system of the present invention shown in FIG. 3.

The two major programmable components in the transparent telephony system of FIG. 3 consist of PC 58 and DSP board 52. PC 58 and DSP board 52 are programmed to perform several main procedures, including initialization (a), user-specific set-up (b), handling of speech events (c) and handling of network events (d). The basic software architecture of the transparent telephony system is illustrated in FIG. 4. A more detailed description of each of these procedures is provided below.

Figure 5:
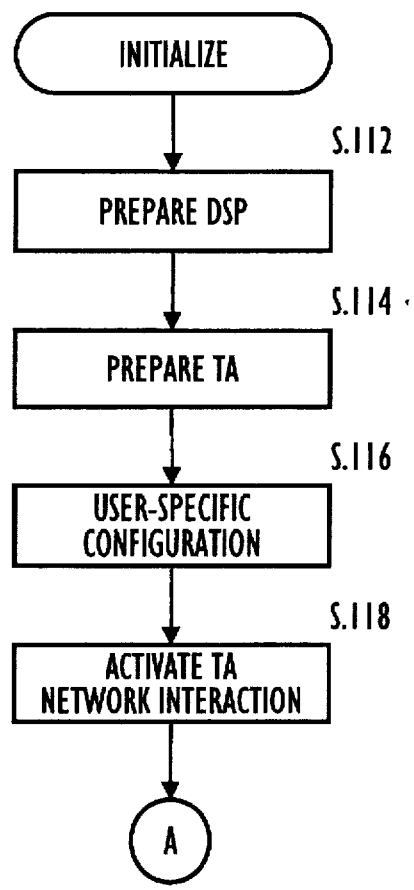
FIG. 5 is a logical flow diagram of the initialization procedure of the transparent telephony system of the present invention shown in FIG. 3.

Referring to FIG. 5, the initialization procedure is arranged and controlled by PC 58, and involves the initialization and downloading of DSP board 52 and TA board 62. At step S.112, DSP board 52 is prepared for handling speech events by downloading and running executable software of the DSP board. At step S.114, TA board 62 is then prepared by configuring the TA board to communicate with communications network 32. Thereafter, at step S.116, PC 58 performs user-specific configurations and set-up. This enrollment session involves prompting the user for defining voice commands and for entering the names and phone numbers of others that may be reached through the transparent telephony system. These prompts to the user may be made audibly with, for example, speaker 14, or visually through, for example, a display screen (not shown) of PC 58. Voice utterances made by the user in response to the audible or visual prompts are analyzed by DSP board 52 and are stored and indexed in memory (e.g., random access memory (RAM) or storage disks) of PC 58 for future reference. The enrollment session may include a tutorial and/or a set up mode to instruct and assist the user in configuring the system. After step S.116, PC 58 activates TA board 62 for network interaction at step S.118 so that the TA board is ready to accept any network initiated events.

The handling of speech events and network events are asynchronous, and must be accepted independently. The principle speech events are spoken word commands, which are detected and recognized by DSP board 52. The determination of what specific actions should be taken as a result of certain speech events is handled by PC 58. The speech commands, which are input through microphone 16, may include names, numbers or any other form of speech that DSP board 52 is capable of reliably recognizing. DSP board 52, however, may be implemented to use speaker-dependent isolated word speech recognition, so that DSP board only recognizes one person's speech reliably, and words or short continuous phrases that are preceded and followed by silence.

In the embodiment of FIG. 3, four sets of command vocabularies are used which are stored in an external or internal memory (not shown in the drawings) that is accessible to PC 58. These vocabulary sets include an access vocabulary, a control vocabulary, a response vocabulary, and a disconnect vocabulary. The first command vocabulary set, i.e., the access vocabulary, includes the names of other users, as specified by the user, that the transparent telephony system can connect with, and the "names" of various system control functions. The control vocabulary includes voice commands that allow additions and deletions to be made to the access vocabulary (e.g., "add-name" and "delete-name"). The control vocabulary also includes voice commands for privacy control, customization of call handling functions, scheduling, etc. The third command vocabulary, i.e., the response vocabulary, includes all of the possible responses that a user can make when receiving a call attempt. This could include, e.g., call acceptance phrases such as "go-ahead" and call rejection phrases such as "not-now". Other commands pertaining to call handling functions, such as "delay call" and "leave message" functions, can also be included in the response vocabulary. Lastly, the disconnect vocabulary includes voice commands that indicate the end of a phone call (e.g., "goodbye" or "disconnect") as defined by the user. Each of these command vocabularies may be predefined by the user during the user-specific set-up procedure, and/or may include predetermined default voice commands that may be altered by the user. The commands noted above are merely exemplary and should not limit the invention to any specific command vocabulary set or sets.

Only one set of command vocabularies is active at any point in time. The access vocabulary is originally activated after the initialization procedure. Thereafter, the determination of what set of command vocabularies is activated and recognizable by DSP board 52 is based on the occurrence of certain events. The vocabulary activation events are depicted in FIG. 6.

Figure 6:
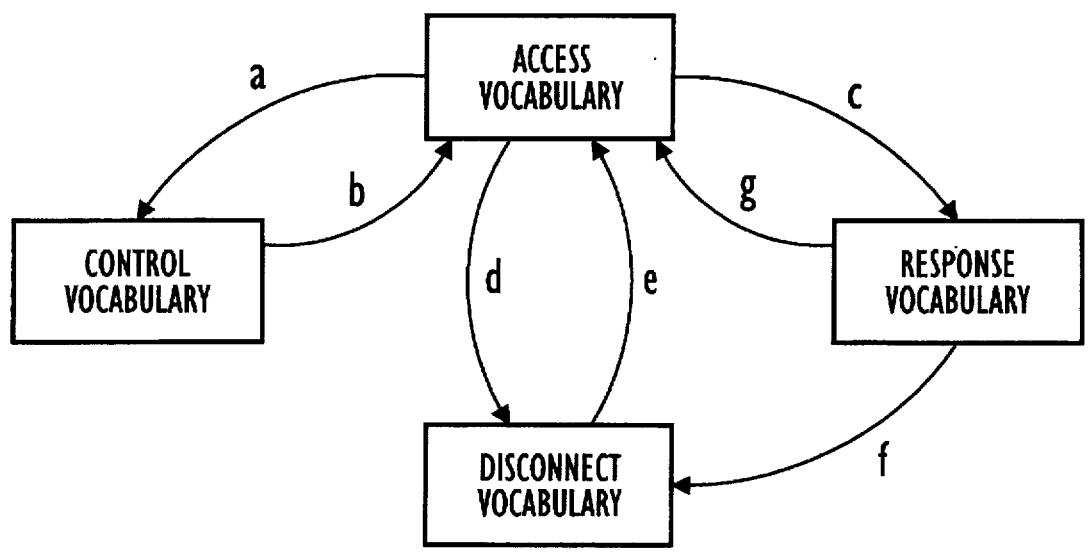
FIG. 6 illustrates exemplary activation events for the command vocabularies of the transparent telephony system of the present invention depicted in FIG. 3.

As shown in FIG. 6, activation of the control vocabulary from the access vocabulary, as indicated by line "a" occurs when a request for the control vocabulary is explicitly made by the user. As indicated by line "b", reactivation of the access vocabulary from the control vocabulary occurs upon the termination of a control session during which a user may make additions or deletions to the access vocabulary. The control session may also include a-tutorial and/or set up mode to instruct and assist the user in configuring and using the system, including, e.g., making additions and deletions to the access vocabulary.

When a transparent telephony station receives a call attempt, the response vocabulary is activated and the access vocabulary is deactivated, as indicated by line "c" in FIG. 6. If the call attempt is refused, the response vocabulary is deactivated and the access vocabulary is reactivated, as indicated by line "g" in the figure. If, however, the call attempt is accepted, the response vocabulary is deactivated and the disconnect vocabulary is activated, as indicated by line "f". Thereafter, if termination or disconnection of the call is explicitly indicated by the user, the disconnect vocabulary is deactivated and the access is reactivated (see line "e"). As shown by line "d" in FIG. 6, the disconnect vocabulary can be activated directly from the access vocabulary when a call attempt is made by the user and accepted at the other end by the call recipient.

Any vocabulary utterances made by the user which are not within the command vocabulary that is currently activated may be rejected by the DSP board 52 based on its dissimilarity with the active referenced utterances stored in memory. Artificial intelligence and other available technology may be utilized with the signal and speech processing conducted by DSP board 52, in order to detect voice utterances that may not be exactly the same as the voice commands contained within the activated command vocabulary.

Figure 7:
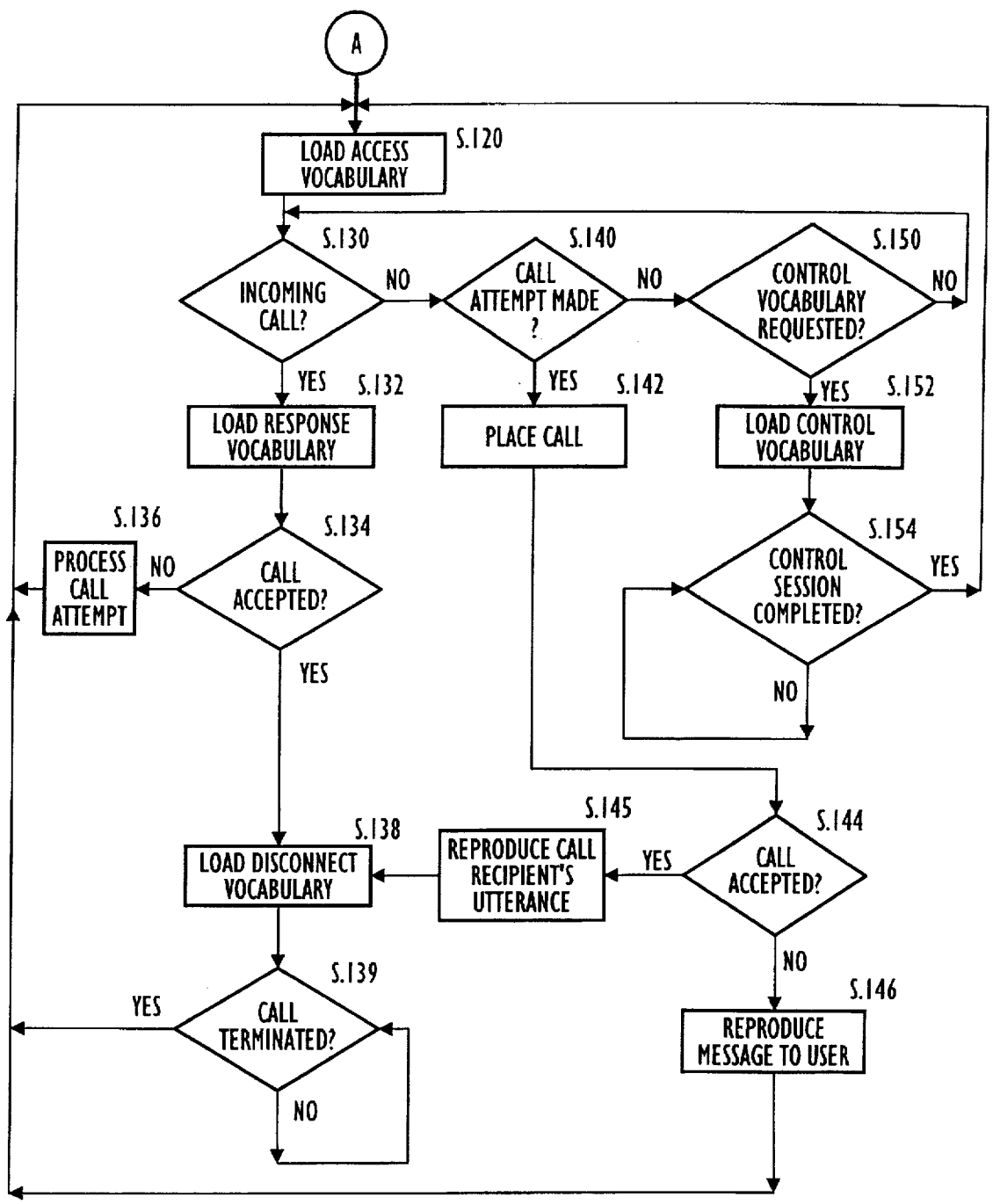
FIG. 7 illustrates a logical flow diagram of the transparent telephony system following the initialization procedure illustrated in FIG. 5.

Referring now to FIG. 7, the logical flow of the transparent telephony system of FIG. 3 for handling speech and network events will be described. It is noted that FIG. 7 illustrates the logical flow of the transparent telephony system following the initialization procedure shown in FIG. 5.

After DSP board 52 and TA board 62 have been initialized and activated, PC 58 downloads and activates the access vocabulary at step S.120. At this point in time, the customer premise equipment provided at each location is prepared to handle either speech or network events. Thus, TA board 62 constantly monitors the network for incoming calls, while DSP board 52 constantly monitors for voice utterances made by a user for initiating a call attempt or accessing the control features.

If an incoming call attempt is detected by TA board 62 at step S.130, PC board 58 will download and activate the response vocabulary from the memory of PC 58 at step S.132. At this stage, voice commands within the response vocabulary are expected from the user for indicating how to handle and process the call. If the user makes the appropriate voice command to accept the call (e.g. "go-ahead") after hearing the caller's voice utterance reproduced by speaker 14, DSP board 52 will detect and recognize the acceptance of the call at step S.134 and indicate the call acceptance to PC 58. Thereafter, the user's affirmative response will be forwarded to the caller and full-duplex communication will be established. PC 58 will then download and activate the disconnect vocabulary at step S.138 and the DSP board 52 will constantly monitor the user's voice utterances at step S.139 to detect whether a voice command for disconnecting the call has been made. When an appropriate voice command by the user has been given to terminate the call, logical flow goes back to step S.120, and the access vocabulary may again be downloaded and activated. The termination of the call may be confirmed by means of an appropriate confirmation procedure (e.g., by asking the person who requested termination if he/she is certain).

If DSP board 52 does not detect a voice command for call acceptance at step S.134, then the call will be processed at step S.136 in accordance with the other possible voice commands within the response vocabulary that can be uttered by the user or by default procedures in the case of no utterances by the user. For example, the user could issue a voice command to refuse the call, delay the call, play back a recorded message or take a message from the caller. In addition, the user could issue a voice command to refuse all incoming calls during a "no receive" time period defined by the user.

By way of example, if the user utters the appropriate voice command for delaying the call, acceptance of the call may be delayed by a predetermined amount of time, or the call may be delayed based on some type of priority scheme. On the other hand, if the user utters the proper voice command to refuse the call or play back a recorded message, PC 58 may download the appropriate voice message that is stored in internal or external memory (not shown), and the message will be forwarded over communications network 32 so that it may be reproduced by the customer premise equipment provided at the caller's location. Alternatively, if the user utters the appropriate voice command to take a message from the caller, PC 58 may download a recorded message from memory that instructs the caller to leave a message. The voice message that is left by the caller may be recorded in memory by PC 58, after it is forwarded over the communications network 32, so that it may be later played back to the user when the appropriate voice command is given. A conventional answering machine controlled by PC 58 may, for example, be provided for recording and playing back voice messages.

After the call has been processed at step S.136, logical flow returns to step S.120 so that the access vocabulary may be downloaded and activated.

When a user wishes to place a call and utters the name of another transparent telephony user, the call attempt is detected by DSP board 52 at step S.140, and the process to place the call is initiated at step S.142. At step S.142, the voice utterance of the user is temporarily stored in the memory of PC 58, and the call attempt is made over communication network 32 to the call recipient based on the detection and recognition of the uttered recipient's name by DSP board 52. If the call recipient's equipment responds, the stored voice utterance is forwarded over the communications network and the received digitized voice utterance is processed and converted by DSP board 52 of the recipient's equipment and reproduced in acoustic form. If the call recipient accepts the call by uttering an appropriate voice command, the recognized affirmative voice response is forwarded back to the caller and full-duplex voice communication is established between the caller and the call recipient. At step S.144, the acceptance of the call is detected, the call recipient's voice utterance is reproduced to the caller at step S.145, and the disconnect vocabulary is downloaded and activated at S.138 by PC board 58. Thereafter, logical flow proceeds as described above.

If call acceptance is not detected at step S.144, then at step S.146 an appropriate message stored in PC 58 may be played back to the user who initiated the call to indicate refusal of the call before logical flow goes back to step S.120. The stored message that is played back to the user may be a generic/caller-independent stored message or may be selected from a plurality of stored messages in accordance with the caller's identity, which can be automatically determined by an appropriately placed and configured SIR device.

At step S.150, if DSP board 52 detects and recognizes the appropriate voice command requiring activation of the control vocabulary, then PC 58 will download and activate the control vocabulary at step S.152 and the control session will be initiated. As noted above, during the control session, the user may make additions to or deletions from the access vocabulary. Upon the termination of the control session, as determined at step S.154, which may be indicated by voice command, logical flow proceeds back to step S.120, and PC 58 may then download and activate the access vocabulary.

As discussed above, speech processing system 22 and DSP board 52 may be implemented by commercially available components and utilize known speech technology mechanisms. For more information relating to speech recognition and detection, see Parsons, Thomas W., "Voice and Speech Processing", McGraw-Hill Book Company, New York, 1987; and Rabiner, L. R., and Schafer, R. W., "Digital Processing of Speech Signals", Prentice-Hall, Inc., Englewood Cliffs, N. J., 1978, each of which is expressly incorporated herein by reference in its entirety. Additional information relating to speech technology may be found in journals such as the annual proceedings of the IEEE International Conference on Acoustics, Speech and Signal Processing (ICASSP), or the IEEE Transactions on Signal Processing.

By way of example, DSP board 52 may utilize various known speech processing techniques for detecting and recognizing voice utterances. For example, after linearly digitizing voice signals input by microphone 16 and pre-amplifier 17, the input signal may be high-frequency pre-emphasized and windowed with a Hamming function by DSP board 52. The Hamming function windows may be approximately 30 ms in duration and overlapped by two-thirds. The windowed signal may then be converted into a tenth order Linear Predictive Coding (LPC)-Cepstrum representation. The LPC parameters may be computed from the auto-correlation function using Durbin's recursive technique described at page 411 of Rabiner and Schafer. Isolated words or phrases may be detected by DSP board 52 using an energy-based endpointing algorithm similar to that described in Lamel, L. F., et al., "An Improved Endpoint Detector for Isolated Word Recognition", IEEE Trans., Vol. ASSP-29, pages 777–785, August 1981, the content of which is expressly incorporated herein by reference in its entirety. Further, the registered cepstrum representations of the input voice signals may be compared to pre-registered cepstrum representations of the same words using dynamic programming techniques such as that described in Sakoe, H. and Chiba, C., "Dynamic Programming Algorithm Optimization for Spoken Word Recognition", IEEE Transaction, Vol. ASSP-26, No. 1, pages 43–49, February. 1978, the content of which is expressly incorporated herein by reference in its entirety. In addition, a simple best-match decision rule with a confidence threshold may be used to determine the outcome of a speech recognition attempt. PC-compatible boards that perform such speech recognition tasks are commercially available. For instance, the VR/121 Voice Recognition System manufactured by Dialogic Corporation, Parsippany, N.J. is one such example.

Further, the DSP board 52 may be programmed to manage multiple tasks simultaneously. For example, DSP board 52 could be programmed to record voice utterances from microphone 16 and pre-amplifier 17 while simultaneously outputting voice signals to speaker 14.

In the transparent telephony system of FIG. 3, TA board 62 may be set up using two "B" channels of the ISDN using the V.120 circuit-switched data calls. Depending on computational resources, one B channel may be used instead of two. PC compatible plug-in boards for speech encoding are commercially available. For example, one can use the DIALOG/121A Multi-line Voice Communications System that is manufactured by Dialogic Corporation, Parsippany, N.J. The actual programming of TA board 62 is manufacturer specific. Thus, if a Teleos B101PC ISDN terminal adapter is used for TA board 62, the instructions for programming the V.120 data transfers are provided in the Teleos ASK101 Access Systems Kit Applications Interface User's Guide, which is expressly incorporated herein by reference in its entirety.

While the invention has been described with reference to several exemplary embodiments, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

For example, although the transparent telephony system of the present invention allows for totally-hands-free communication, since no hardware need ever be handled during the course of a call, the specialized station set 12 may be provided with a touch-tone keypad or keyboard as an alternative input device for initiating and processing calls. The station set 12 may also include a screen, such as a liquid crystal display (LCD), in order to provide confirmation of what is being input by the user and serve as an alternative output device for the system.

In addition, as part of the available call processing operations, a "do not disturb" feature may be incorporated wherein incoming calls are automatically routed to some other destination such as an answering service. The above-noted "do not disturb" feature could be activated and/or deactivated by voice command. A "call forwarding" feature may also be incorporated wherein calls initiated to a call destination are automatically routed to another transparent telephony location indicated by the call recipient. The above-noted "call forwarding" feature may also be implemented so as to be activated and/or deactivated by voice command.

Further, although particular embodiments of the transparent telephony system of the present invention have been disclosed with CPE-based speech processing, it may be desirable to provide network-based speech processing and centralized control in order to more efficiently adapt advances in underlying speech technologies in the future and provide an architecture that is more location independent.

Also, the transparent telephony system of the present invention is not limited to home or office use, and may be embodied in motor vehicles. For example, a radio or microwave link may be provided between the customer premise equipment and the network system in order to provide user mobility while still having access to other transparent telephony users.

Alternatively, the transparent telephony system of the present invention may also be embodied in a Personal Communications Services (PCS) environment comprising a personal locator system, so that when a call is initiated, the call attempt may be forwarded to the call recipient's location or network address, in accordance with information from a database provided in conjunction with the personal locator system.

Further, as noted above, many of the features and components illustrated as part of individual embodiments above, e.g., auto-call screening system 30, privacy system 18, 20, caller-ID system 13, or PC and board combination 52, 58, 62, can be incorporated, where appropriate, into the system of the other illustrated embodiments.

What is claimed:

1. A telephony system for establishing voice communication over a communication network between a caller and a call recipient, comprising:
   means for initiating a call from a caller's location to a call destination based on a voice utterance made by said caller; and
   means for reproducing, at said call destination, an audible likeness of said voice utterance made by said caller subsequent to the call being initiated by said initiating means, so as to enable said call recipient to identify said caller on the basis of voice characteristics of said caller.

2. A system according to claim 1, wherein said initiating means comprises an automatic speech recognition system for detecting and recognizing spoken voice utterances.

3. A system according to claim 2, wherein said initiating means comprises means for determining said call destination based on a detection and recognition of said caller's voice utterance by said automatic speech recognition system.

4. A system according to claim 3, wherein said determining means includes a list stored in a memory device for determining said call destination based on the detection and recognition of said caller's voice utterance by said automatic speech recognition system.

5. A system according to claim 4, wherein said voice utterance comprises a recognizable name of said call recipient.

6. A system according to claim 3, wherein said reproducing means comprises means for converting said voice utterance from an acoustic form into an electrical form, and means for forwarding said voice utterance in said electrical form to said call destination which is determined by said determining means.

7. A system according to claim 6, wherein said means for converting said voice utterance from said acoustic form into said electrical form includes a microphone provided at said call destination.

8. A system according to claim 6, wherein said reproducing means further comprises means for converting said voice utterance forwarded by said forwarding means in said electrical form into an acoustic form.

9. A system according to claim 8, wherein said means for converting said voice utterance in said electrical form into said acoustic form includes a speaker provided at said call destination.

10. A system according to claim 1, further comprising means for processing the call based upon a voice utterance made by a call recipient, said processing means enabling said call recipient to optionally accept the call and establish two-way voice communication subsequent to said voice utterance made by said caller being reproduced by said reproducing means.

11. A system according to claim 10, further comprising means for reproducing an audible likeness of said voice utterance made by said call recipient at said caller's location based upon the acceptance of the call.

12. A system according to claim 1, wherein said call destination comprises one of a call recipient's location and network address.

13. A telephony system for establishing voice communication over a communication network between a caller and a call recipient, comprising:
   means for initiating a call from a caller's location to a call destination based on a voice utterance made by said caller, said initiating means establishing one-way voice communication between said caller's location and said call destination;
   means for reproducing, at said call destination, said voice utterance made by said caller subsequent to the call being initiated by said initiating means, so that said call recipient can identify said caller; and
   means for processing the initiated call based upon a voice utterance made by said call recipient, said processing means enabling said call recipient to optionally accept the call and establish two-way communication with said caller.

14. A system according to claim 13, wherein said reproducing means comprises means for converting said voice utterance made by said caller in an acoustic form into an electrical form, and means for forwarding said voice utterance in said electrical form to said call destination.

15. A system according to claim 14, wherein said means for converting said voice utterance in said acoustic form into said electrical form includes a microphone provided at said caller's location.

16. A system according to claim 14, wherein said reproducing means further comprises means for converting said voice utterance forwarded by said forwarding means in said electrical form into an acoustic form.

17. A system according to claim 16, wherein said means for converting said voice utterance in said electrical form into said acoustic form includes a speaker provided at said call destination.

18. A system according to claim 13, wherein said processing means comprises an automatic speech recognition system for detecting and recognizing spoken voice utterances.

19. A system according to claim 18, wherein said processing means comprises means for enabling said call recipient to optionally select among a plurality of call processing operations and means for performing a selected call processing operation when a predetermined voice command made by said call recipient is detected and recognized by said automatic speech recognition system.

20. A system according to claim 19, wherein said call processing operations include a delay call operation, whereby acceptance of the initiated call is delayed by a predetermined amount of time when said delay call operation is selected by said call recipient by voice command.

21. A system according to claim 19, further comprising a device for recording a voice message and a device for reproducing a recorded voice message.

22. A system according to claim 21, wherein said call processing operations include a voice message playback operation, whereby a recorded voice message is reproduced by said reproducing device and forwarded to said caller's location when said voice message playback operation is selected by said call recipient by voice command.

23. A system according to claim 21, wherein said call processing operations include a voice message record operation, whereby a voice message made by said caller is recorded by said recording device.

24. A system according to claim 13, further comprising means for screening the initiated call, said screening means including a speaker identity recognition system for determining the identity of said caller by detecting and recognizing said voice utterance made by caller, and screening the call based on the determined identity of the caller.

25. A system according to claim 13, further comprising means for disconnecting a call based upon a voice utterance made by said caller or said call recipient, so that said caller or said call recipient can disconnect the call after the call has been accepted by said call recipient.

26. A system according to claim 13, wherein said call destination comprises one of a call recipient's location and network address.

27. A system according to claim 13, further comprising means for reproducing an audible likeness of said voice utterance made by said call recipient at said caller's location based upon the acceptance of the call.

28. A method of selectively establishing voice communication in a telephony system, comprising the steps of:
   initiating a call from a caller's location to a call destination over a communications network based upon a voice utterance made by a caller;
   reproducing, at said call destination, said voice utterance made by said caller after the call has been initiated;
   thereafter processing the call in response to detection of a voice utterance made by a call recipient, so that said call recipient can optionally accept the call and establish two-way voice communication with said caller.

29. A method according to claim 28, wherein said call destination comprises one of a call recipient's location and network address.

30. A telephony system for establishing two-way voice communication over a communications network between a caller and a call recipient, comprising:
   means for initiating a call and establishing one-way voice communication from a caller's location to a call destination in accordance with a voice utterance made by said caller;
   means for reproducing, at said call destination, said caller's voice utterance subsequent to the establishment of one-way voice communication by said initiating means, so that said call recipient can identify said caller; and
   means for processing the initiated call in response to detection of a voice utterance made by said call recipient, said processing means enabling said call recipient to optionally accept the call and establish two-way communication with said caller.

31. A system according to claim 30, wherein said initiating means comprises an automatic speech recognition system for detecting and recognizing spoken voice utterances.

32. A system according to claim 31, wherein said initiating means further comprises means for determining said call destination based on a detection and recognition of said caller's voice utterance by said automatic speech recognition system.

33. A system according to claim 32, further comprising means for recording said caller's voice utterance, said reproducing means reproducing said voice utterance recorded by said recording means at said call destination subsequent to the determination of said call destination by said determining means.

34. A system according to claim 32, wherein said initiating means further comprises connection means for establishing a one-way voice communication between said caller and said call recipient based upon the determination of said call destination by said determining means.

35. A system according to claim 34, further comprising means for recording said caller's voice utterance, said reproducing means reproducing said voice utterance recorded by said recording means at said call destination subsequent to the establishment of one-way voice communication by said connecting means.

36. A system according to claim 30, further comprising means for reproducing a synthesized voice message at said call destination subsequent to the call being initiated by said initiating means.

37. A system according to claim 30, further comprising means for reproducing a recorded audio message at said call destination subsequent to the call being initiated by said initiating means.

38. A system according to claim 30, wherein said call destination comprises one of a call recipient's location and network address.

39. A system according to claim 30, further comprising means for reproducing an audible likeness of said voice utterance made by said call recipient at said caller's location based upon the acceptance of the call.

\* \* \* \* \*